(12) United States Patent
Lee

(10) Patent No.: US 10,284,857 B2
(45) Date of Patent: May 7, 2019

(54) METHOD AND APPARATUS FOR EVALUATING VIDEO QUALITY

(71) Applicant: INDUSTRY-ACADEMIC COOPERATION FOUNDATION, YONSEI UNIVERSITY, Seoul (KR)

(72) Inventor: Chul Hee Lee, Goyang (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 274 days.

(21) Appl. No.: 15/486,013

(22) Filed: Apr. 12, 2017

(65) Prior Publication Data

US 2017/0295375 A1    Oct. 12, 2017

(30) Foreign Application Priority Data

Apr. 12, 2016 (KR) .................. 10-2016-0044852

(51) Int. Cl.
*H04N 7/12* (2006.01)
*H04N 19/154* (2014.01)
(Continued)

(52) U.S. Cl.
CPC ........... *H04N 19/154* (2014.11); *H04N 19/53* (2014.11); *H04N 19/182* (2014.11)

(58) Field of Classification Search
CPC ..... H04N 19/154; H04N 19/53; H04N 19/182
(Continued)

(56) References Cited

U.S. PATENT DOCUMENTS

| 2008/0025400 A1* | 1/2008 | Sugimoto | ............ H04N 19/176 375/240.16 |
| 2013/0159495 A1* | 6/2013 | Wang | ................... H04N 19/146 709/224 |

(Continued)

FOREIGN PATENT DOCUMENTS

| JP | 2011-217345 A | 10/2011 |
| JP | 2012-039530 A | 2/2012 |

(Continued)

*Primary Examiner* — Howard D Brown, Jr.

(57) ABSTRACT

A method and apparatus for evaluating video quality are disclosed. An apparatus for evaluating video quality according to an embodiment of the invention includes: an encoder unit that converts a first-resolution original video sequence into a second-resolution original video sequence and encodes the second-resolution original video sequence; decoder unit that generates a second-resolution decoded video sequence by decoding the encoded second-resolution video sequence and converts the second-resolution decoded video sequence into a first-resolution decoded video sequence by interpolating the second-resolution decoded video sequence to the first resolution; a video quality index calculator unit that calculates a first video quality index by comparing the first-resolution original video sequence with the first-resolution decoded video sequence and calculates a second video quality index by comparing the second-resolution original video sequence with the second-resolution decoded video sequence; and a video quality evaluator unit that calculates a final video quality index by using the first video quality index and the second video quality index.

17 Claims, 6 Drawing Sheets video quality evaluation apparatus is connected to the transmitting device video quality evaluation apparatus is connected to the receiving device

(51) Int. Cl.
*H04N 19/53* (2014.01)
*H04N 19/182* (2014.01)

(58) Field of Classification Search
USPC ......... 375/240, 240.01, 240.12, 240.16, 224,
375/225, 227, 228, E7.104, E7.105
See application file for complete search history.

(56) References Cited

U.S. PATENT DOCUMENTS

| 2013/0215213 A1* | 8/2013 | Power | H04L 65/4076 |
| | | | 348/14.02 |
| 2014/0241415 A1* | 8/2014 | Su | H04N 19/142 |
| | | | 375/240.02 |

FOREIGN PATENT DOCUMENTS

| JP | 2014-036260 A | 2/2014 |
| KR | 10-2006-0011280 A | 2/2006 |

* cited by examiner

DRAWINGS video quality evaluation apparatus is connected to the transmitting device video quality evaluation apparatus is connected to the receiving device $VQM_{final} = a_1VQM_1 + a_2VQM_2 + a_3VQM_3 + a_4VQM_4 + a_5VQM_5 + a_6VQM_6$

METHOD AND APPARATUS FOR EVALUATING VIDEO QUALITY

CROSS-REFERENCE TO RELATED APPLICATIONS

This application claims the benefit of Korean Patent Application No. 10-20 16-0044852, filed with the Korean Intellectual Property Office on Apr. 12, 2016, the disclosure of which is incorporated herein by reference in its entirety.

BACKGROUND

1. Technical Field

The present invention relates to a method and apparatus for evaluating video quality, more particularly to a technique for objectively evaluating a video sequence that has a reduced resolution compared to an original video sequence and a multi-resolution video quality evaluation technique.

2. Description of the Related Art

The technology of evaluating video quality is ever growing in importance, especially in view of its critical role in fields relating to verifying the performances of video codecs and developing new compression coding techniques as well as evaluating video transmission quality, and the like.

Until now, evaluating video quality entailed a plurality of evaluators providing their own subjective opinions. This method, however, is very inefficient, being greatly limited in terms of time and cost, and having an additional drawback in that real time evaluation is not possible.

In particular, due to advances in digital technology and communications technology, techniques have been developed that allow digitalizing video sequences and transmitting the images over a network. In systems for transmitting encoded images based on such digital techniques, it is important to monitor the video quality at the receiving device.

Conventional video transmission systems were developed with the assumption that the original video sequence transmitted from the transmitting device and the processed video sequence received at the receiving device have the same resolution. However, due to problems in the network environment, etc., cable and Internet multimedia services often use a method of reducing the screen of the original video sequence for transmission and restoring the screen of the original video sequence for output when the video sequence is played.

For example, an original video sequence having a resolution of 1080 lines may be reduced to a 720 line resolution and encoded by a transmitting device when the video sequence is transmitted to a receiving device, and after the receiving device receives and decodes the video sequence, it may be converted back to the resolution of the original video sequence (1080 pixels) when it is displayed.

With this existing method, however, it may be difficult to accurately predict the video quality perceived by the viewer at the receiving device.

SUMMARY OF THE INVENTION

To resolve the problems in the related art described above, an aspect of the invention aims to provide a way to objectively and more accurately evaluate the video quality perceived by the viewer, for a video sequence that is transmitted with a reduced resolution compared to the resolution of an original video sequence.

Also, an aspect of the invention aims to provide a method of evaluating video quality using a multi-resolution approach that can increase performance compared to existing methods.

To achieve the objectives above, an embodiment of the invention provides an apparatus for evaluating video quality that includes: an encoder unit configured to convert a first-resolution original video sequence into a second-resolution original video sequence by reducing the first-resolution original video sequence from a first resolution to a second resolution and encode the second-resolution original video sequence; a decoder unit configured to generate a second-resolution decoded video sequence by decoding the encoded second-resolution video sequence and convert the second-resolution decoded video sequence into a first-resolution decoded video sequence by interpolating the second-resolution decoded video sequence to the first resolution; a video quality index calculator unit configured to calculate a first video quality index based on a comparison between the first-resolution original video sequence and the first-resolution decoded video sequence and calculate a second video quality index based on a comparison between the second-resolution original video sequence and the second-resolution decoded video sequence; and a video quality evaluator unit configured to calculate a final video quality index by using the first video quality index and the second video quality index.

To achieve the objectives above, another embodiment of the invention provides an apparatus for evaluating video quality that includes: an input unit configured to receive from a transmitting device an encoded form of a second-resolution original video sequence, information pertaining to characteristics of the first-resolution original video sequence, and information pertaining to characteristics of the second-resolution original video sequence, where the second-resolution original video sequence is obtained by reducing a first-resolution original video sequence from a first resolution to a second resolution; a decoder unit configured to generate a second-resolution decoded video sequence by decoding the encoded second-resolution video sequence and convert the second-resolution decoded video sequence into a first-resolution decoded video sequence by interpolating the second-resolution decoded video sequence to the first resolution; a video quality index calculator unit configured to calculate a first video quality index based on a comparison between the information pertaining to characteristics of the first-resolution original video sequence and the first-resolution decoded video sequence and calculate a second video quality index based on a comparison between the information pertaining to characteristics of the second-resolution original video sequence and the second-resolution decoded video sequence; and a video quality evaluator unit configured to calculate a final video quality index by using the first video quality index and the second video quality index.

To achieve the objectives above, an embodiment of the invention provides a method of evaluating video quality that includes: (a) converting a first-resolution original video sequence into a second-resolution original video sequence and encoding the second-resolution original video sequence, where converting the first-resolution original video sequence into the second-resolution original video sequence includes reducing the first-resolution original video sequence from a first resolution to a second resolution; (b) generating a second-resolution decoded video sequence by decoding the encoded second-resolution video sequence and converting the second-resolution decoded video sequence into a first-resolution decoded video sequence by interpolating the second-resolution decoded video sequence to the first resolution; (c) calculating a first video quality index based on a comparison between the first-resolution original video sequence and the first-resolution decoded video sequence and calculating a second video quality index based on a comparison between the second-resolution original video sequence and the second-resolution decoded video sequence; and (d) calculating a final video quality index by using the first video quality index and the second video quality index.

To achieve the objectives above, another embodiment of the invention provides a method of evaluating video quality that includes: (a) receiving from a transmitting device an encoded form of a second-resolution original video sequence, information pertaining to characteristics of the first-resolution original video sequence, and information pertaining to characteristics of the second-resolution original video sequence, where the second-resolution original video sequence is obtained by reducing a first-resolution original video sequence from a first resolution to a second resolution; (b) generating a second-resolution decoded video sequence by decoding the encoded second-resolution video sequence and converting the second-resolution decoded video sequence into a first-resolution decoded video sequence by interpolating the second-resolution decoded video sequence to the first resolution; (c) calculating a first video quality index based on a comparison between the information pertaining to characteristics of the first-resolution original video sequence and the first-resolution decoded video sequence and calculating a second video quality index based on a comparison between the information pertaining to characteristics of the second-resolution original video sequence and the second-resolution decoded video sequence; and (d) calculating a final video quality index by using the first video quality index and the second video quality index.

To achieve the objectives above, still another embodiment of the invention provides an apparatus for evaluating video quality that includes: a resolution reducer unit configured to generate a plurality of reduced-resolution original video sequences by reducing a resolution of an original video sequence to a plurality of resolutions; an encoder unit configured to encode the original video sequence and the plurality of reduced-resolution original video sequences; a decoder unit configured to generate an original-resolution decoded video sequence by decoding the encoded original video sequence and generate a plurality of reduced-resolution decoded video sequences by decoding the plurality of encoded reduced-resolution original video sequences; a video quality index calculator unit configured to calculate an original-resolution quality index based on a comparison between the original video sequence and the original-resolution decoded video sequence and calculate a plurality of reduced-resolution quality indexes based on comparisons between the plurality of reduced-resolution original video sequences and the plurality of reduced-resolution decoded video sequences, respectively; and a video quality evaluator unit configured to calculate a final video quality index by using the original-resolution quality index and the plurality of reduced-resolution quality indexes.

To achieve the objectives above, still another embodiment of the invention provides a method of evaluating video quality that includes: (a) generating a plurality of reduced-resolution original video sequences by reducing a resolution of an original video sequence to a plurality of resolutions; (b) encoding the original video sequence and the plurality of reduced-resolution original video sequences; (c) generating an original-resolution decoded video sequence by decoding the encoded original video sequence and generating a plurality of reduced-resolution decoded video sequences by decoding the plurality of encoded reduced-resolution original video sequences; (d) calculating an original-resolution quality index based on a comparison between the original video sequence and the original-resolution decoded video sequence and calculating a plurality of reduced-resolution quality indexes based on comparisons between the plurality of reduced-resolution original video sequences and the plurality of reduced-resolution decoded video sequences, respectively; and (e) calculating a final video quality index by using the original-resolution quality index and the plurality of reduced-resolution quality indexes.

To achieve the objectives above, yet another embodiment of the invention provides an apparatus for evaluating video quality that includes: an input unit configured to receive input of information pertaining to characteristics of a first-resolution original video sequence, information pertaining to characteristics of a plurality of reduced-resolution original video sequences obtained by reducing the first-resolution original video sequence from a first resolution to a plurality of resolutions, and a specified-resolution encoded video encoded in the specified resolution, where the specified resolution is any one of the first resolution and the plurality of resolutions; a decoder unit configured to generate a specified-resolution decoded video sequence by decoding the specified-resolution encoded video and generate a first-resolution decoded video sequence and reduced-resolution decoded video sequences by interpolating or reducing the specified-resolution decoded video sequence, where the first-resolution decoded video sequence has the same resolution as the first-resolution original video sequence, and the reduced-resolution decoded video sequences have the same resolutions as the reduced-resolution original video sequences; a video quality index calculator unit configured to calculate a plurality of quality indexes by using the information pertaining to characteristics of the first-resolution original video sequence, the information pertaining to characteristics of the plurality of reduced-resolution original video sequences, the first-resolution decoded video sequence, and the reduced-resolution decoded video sequences; and a video quality evaluator unit configured to calculate a final video quality index by using the plurality of quality indexes. Here, the specified-resolution encoded video, the information pertaining to characteristics of the first-resolution original video sequence, and the information pertaining to characteristics of the plurality of reduced-resolution original video sequences are received from a transmitting device.

To achieve the objectives above, yet another embodiment of the invention provides a method of evaluating video quality that includes: (a) receiving input of information pertaining to characteristics of a first-resolution original video sequence, information pertaining to characteristics of a plurality of reduced-resolution original video sequences obtained by reducing the first-resolution original video sequence from a first resolution to a plurality of resolutions, and a specified-resolution encoded video encoded in a specified resolution, where the specified resolution is any one of the first resolution and the plurality of resolutions; (b) generating a specified-resolution decoded video sequence by decoding the specified-resolution encoded video and generating a first-resolution decoded video sequence and reduced-resolution decoded video sequences by interpolating or reducing the specified-resolution decoded video sequence, where the first-resolution decoded video sequence has the same resolution as the first-resolution original video sequence, and the reduced-resolution decoded video sequences have the same resolutions as the reduced-resolution original video sequences; (c) calculating a plurality of quality indexes by using the information pertaining to characteristics of the first-resolution original video sequence, the information pertaining to characteristics of the plurality of reduced-resolution original video sequences, the first-resolution decoded video sequence, and the reduced-resolution decoded video sequences; and (d) calculating a final video quality index by using the plurality of quality indexes. Here, the specified-resolution encoded video, the information pertaining to characteristics of the first-resolution original video sequence, and the information pertaining to characteristics of the plurality of reduced-resolution original video sequences are received from a transmitting device.

According to an embodiment of the invention, the video quality perceived by the viewer can be evaluated objectively and with greater accuracy for a video sequence that is transmitted in a reduced resolution compared to the resolution of an original video sequence can be evaluated.

Also, the video quality evaluation can be performed using a multi-resolution approach to allow improved performance compared to existing methods.

Additional aspects and advantages of the present invention will be set forth in part in the description which follows, and in part will be obvious from the description, or may be learned by practice of the invention. The effects of the invention are not limited to those described above and may include all effects that can be deduced from the composition of the invention disclosed in the specification and scope of claims.

DETAILED DESCRIPTION OF THE INVENTION

Figure 1A:
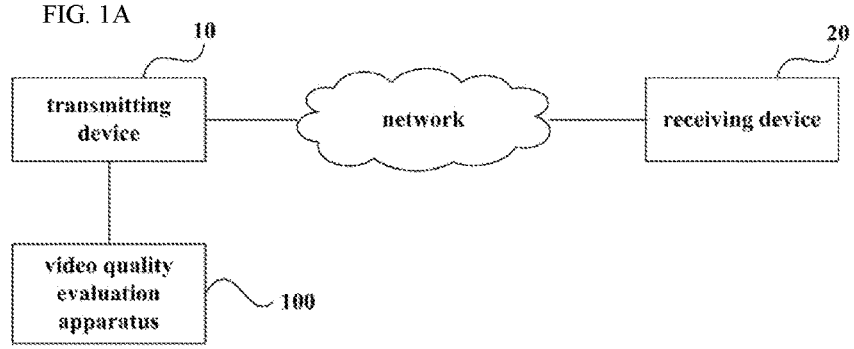
FIGS. 1A and 1B illustrate the composition of a video quality evaluation system according to an embodiment of the invention.

Certain embodiments of the invention are described below with reference to the accompanying drawings. It is to be appreciated, however, that the invention can be implemented in various different forms and is not limited to the embodiments described herein.

To facilitate a clear understanding of the invention, parts that are unrelated to the descriptions have been omitted in the drawings. Like reference numerals are designated for like elements throughout the specification.

In the specification, mention of a part being "connected" to another part not only refers to the parts being "directly connected" but also encompasses cases in which the parts are "indirectly connected" with one or more other member present in-between.

Also, if a part is mentioned as "including" a component, this is intended to mean that one or more other component may be present and is not intended to exclude the presence of other components unless specifically stated to the contrary.

A more detailed description of certain embodiments of the invention is provided below with reference to the accompanying drawings.

Figure 1B:
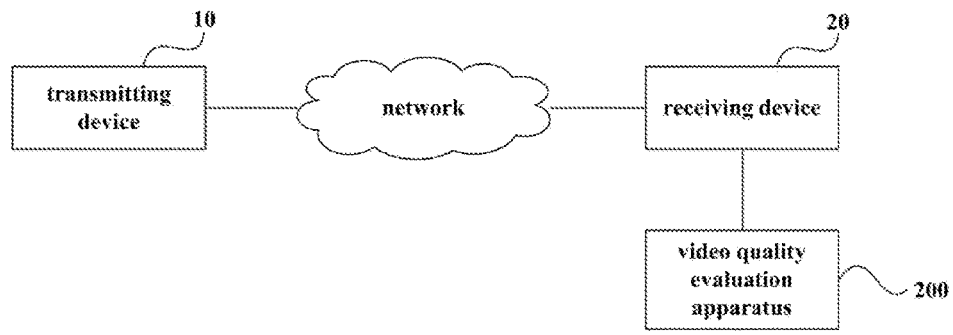

FIGS. 1A and 1B illustrate the composition of a video quality evaluation system according to an embodiment of the invention.

A video quality evaluation system according to an embodiment of the invention is for objectively evaluating video quality perceived by the viewer when a video sequence is transmitted with its size reduced from the original. The video quality evaluation system can include a transmitting device 10 that transmits video sequences over a network and a receiving device 20 that receives and outputs the video sequence transmitted over a network by the transmitting device 10, while a video quality evaluation apparatus 100 can be connected with the transmitting device 10 or connected with the receiving device 20.

Here, a "network" can be any type of wired or wireless communication network, while a receiving device 20 can be any user terminal that can be connected over a network with the transmitting device 10. Examples of a receiving device 20 can include mobile communication terminals such as smart phones, tablet computers, PMP, etc., as well as laptop computers, desktop computers, set-top boxes, and the like.

Looking at each of the components, a video quality evaluation apparatus 100 according to an embodiment of the invention can be connected with the transmitting device 10 or the receiving device 20 to objectively evaluate the video quality perceived by the viewer.

Considering an example in which the video quality evaluation apparatus 100 is connected with the transmitting device 10, an original video sequence having a first resolution (hereinafter referred to as a "first-resolution original video sequence") can be reduced to a specified resolution for transmission to the receiving device 20 (hereinafter referred to as a "second resolution") and thus be converted to a second-resolution original video sequence by the video quality evaluation apparatus 100.

Also, the video quality evaluation apparatus 100 can encode the second-resolution original video sequence, generate a second-resolution decoded video sequence by decoding the encoded second-resolution video sequence, and generate a first-resolution decoded video sequence by interpolating the second-resolution decoded video sequence to the first resolution.

Further, the video quality evaluation apparatus 100 can compare the first-resolution original video sequence with the first-resolution decoded video sequence to calculate a video quality index (hereinafter referred to as a "first video quality index") and can compare the second-resolution original video sequence with the second-resolution decoded video sequence to calculate a video quality index (hereinafter referred to as a "second video quality index").

Afterwards, the video quality evaluation apparatus 100 can use the first video quality index and the second video quality index to calculate a final video quality index, and can estimate a perceptual quality value corresponding to the final video quality index and provide it to the terminal (not shown) of the operator monitoring video quality.

On the other hand, in the calculation of the final video quality index, weights that consider the properties of the video sequence can be applied to the first video quality index and second video quality index.

That is, errors that may occur at the transmitting device 10 side when reducing the resolution of an original video sequence to a specified resolution or when encoding the reduced video, and errors that may occur at the receiving device 20 side when decoding an encoded video received from the transmitting device 10 or when converting the resolution of the decoded video sequence back to the resolution of the original video sequence, as well as other errors can be incorporated in calculating the video quality indexes, allowing a more objective evaluation of the perceptual video quality.

Also, in an arrangement for providing an objective evaluation of the perceptual video quality at the side of the receiving device 20, the video quality evaluation apparatus 100 can generate information pertaining to the characteristics of the first-resolution original video sequence and information pertaining to the characteristics of the second-resolution original video sequence and can provide the information to the receiving device 20, since it may not be easy to acquire the first-resolution original video sequence and second-resolution original video sequence at the receiving device 20.

Also, the second-resolution original video sequence generated by reducing the first-resolution original video sequence to the second resolution can be encoded by the video quality evaluation apparatus 100 and provided to the receiving device 20.

Here, the encoded second-resolution video sequence, the information on the characteristics of the first-resolution original video sequence, and the information on the characteristics of the second-resolution original video sequence can be provided by the video quality evaluation apparatus 100 to the receiving device 20 via the transmitting device 10, or can be provided by the video quality evaluation apparatus 100 to the receiving device 20 directly.

On the other hand, the video quality evaluation apparatus 100 can exist separately from and be connected to the transmitting device 10 as described above, but in some embodiments, the video quality evaluation apparatus 100 can be included within the transmitting device 10, enabling the transmitting device 10 to perform the operations of the video quality evaluation apparatus 100 described above.

A video quality evaluation apparatus 200 according to another embodiment of the invention can be connected with the receiving device 20 to provide an objective evaluation of the perceptual video quality at the receiving device 20 side.

For this, the video quality evaluation apparatus 200 can receive as input an encoded form of the second-resolution original video sequence, which is the first-resolution original video sequence reduced to the second resolution.

Afterwards, the video quality evaluation apparatus 200 can decode the encoded second-resolution video sequence to generate the second-resolution decoded video sequence, and can interpolate the second-resolution decoded video sequence to the first resolution to generate the first-resolution decoded video sequence.

Also, the video quality evaluation apparatus 200 can receive the information pertaining to the characteristics of the first-resolution original video sequence and information pertaining to the characteristics of the second-resolution original video sequence, in addition to the encoded second-resolution video sequence.

The encoded second-resolution video sequence, the information on the characteristics of the first-resolution original video sequence, and the information on the characteristics of the second-resolution original video sequence can be received from the transmitting device 10 via different packets or with a time difference, so as to avoid errors that may occur when they are transmitted simultaneously.

On the other hand, the video quality evaluation apparatus 200 can receive the encoded second-resolution video sequence, the characteristics information of the first-resolution original video sequence, and the characteristics information of the second-resolution original video sequence by way of the receiving device 20 or from the transmitting device 10 directly.

The video quality evaluation apparatus 200 can decode the encoded second-resolution video sequence to generate the second-resolution decoded video sequence, interpolate it to the first resolution to generate the first-resolution decoded video sequence, and calculate a video quality index (hereinafter referred to as a "first' video quality index") by using the characteristics information of the first-resolution original video sequence and the first-resolution decoded video sequence.

Furthermore, the video quality evaluation apparatus 200 can calculate a video quality index (hereinafter referred to as a "second' video quality index") by using the second-resolution decoded video sequence and the characteristics information of the second-resolution original video sequence.

On the other hand, the prime (') denotation used with the first' video quality index and second' video quality index is to differentiate these indexes from the first video quality index and second video quality index calculated at the video quality evaluation apparatus 100 connected with the transmitting device 10.

Afterwards, the video quality evaluation apparatus 200 can use the first' video quality index and second' video quality index to calculate a final video quality index and can select a perceptual quality value corresponding to the final video quality index.

In other words, the video quality evaluation apparatus 200 can calculate the video quality index with a consideration of errors that may occur when, after the encoded second-resolution video sequence is decoded to generate the second-resolution decoded video sequence, the second-resolution decoded video sequence is interpolated to the first resolution, and based on this, can objectively evaluate the perceptual video quality.

On the other hand, the video quality evaluation apparatus 200 can exist separately from and be connected to the receiving device 20 as described above, but in some embodiments, the video quality evaluation apparatus 200 can be included within the receiving device 20, enabling the receiving device 20 to perform the operations of the video quality evaluation apparatus 200 described above.

A video quality evaluation apparatus 100, 200 according to an embodiment of the invention can reduce the first-resolution original video sequence to a plurality of resolutions to generate a plurality of reduced-resolution video sequences, where the first-resolution original video sequence and the multiple number of reduced-resolution video sequences can be encoded and subsequently decoded.

Afterwards, the video quality evaluation apparatus 100, 200 can calculate video quality indexes between the respective pre-encoding video sequences and the post-decoding video sequences and combine them to calculate the final video quality index.

A more detailed description on this approach is provided later on with reference to FIG. 6.

Figure 2:
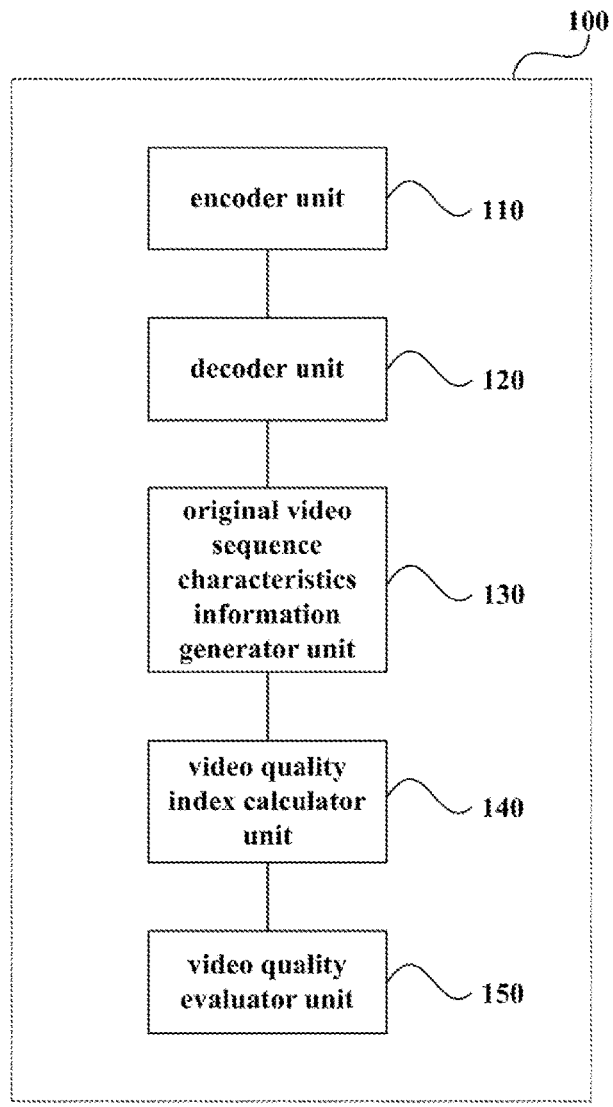
FIG. 2 illustrates the composition of an apparatus for evaluating video quality according to an embodiment of the invention.

FIG. 2 illustrates the composition of an apparatus for evaluating video quality according to an embodiment of the invention.

The video quality evaluation apparatus 100 according to an embodiment of the invention can be connected to a transmitting device 10 and can include an encoder unit 110, a decoder unit 120, an original video sequence characteristics information generator unit 130, a video quality index calculator unit 140, and a video quality evaluator unit 150.

Looking at each of the components, the encoder unit 110 can reduce the first-resolution original video sequence to the second resolution to generate the second-resolution original video sequence and can encode the second-resolution original video sequence.

For example, if the vertical resolution of a first-resolution original video sequence is 1080 pixels and the vertical resolution of video sequences transmitted over the network is 720 pixels, then the encoder unit 110 can convert the vertical resolution of the first-resolution original video sequence to 720 pixels to generate a second-resolution original video sequence, and can encode this video sequence. Of course, in this case, the horizontal resolution may be converted by the same proportion.

On the other hand, the video quality evaluation apparatus 100 can further include an original video sequence input unit (not shown), which may receive the first-resolution original video sequence as input from the transmitting device 10 or from a separate video storage (not shown) that stores the first-resolution original video sequence.

The decoder unit 120 can decode the encoded second-resolution video sequence to generate the second-resolution decoded video sequence and can interpolate the second-resolution decoded video sequence to the first resolution to generate the first-resolution decoded video sequence.

Considering the above example again, the decoder unit 120 can generate a second-resolution decoded video sequence having a vertical resolution of 720 pixels by decoding the encoded second-resolution video sequence, which was previously converted and encoded such that the vertical resolution is 720 pixels, and then generate a first-resolution decoded video sequence by converting the second-resolution decoded video sequence back to a vertical resolution of 1080 pixels.

The original video sequence characteristics information generator unit 130 can extract edge regions of the first-resolution original video sequence, generate mask images from the extracted edge regions, and use the generated mask images and the first-resolution original video sequence to generate information on the characteristics of the first-resolution original video sequence (e.g., information on the edge region images).

Generating information on the characteristics of the second-resolution original video sequence may be performed in the same manner. For the sake of convenience, the descriptions that follow will focus on generating information on the characteristics of the first-resolution original video sequence.

Specifically, the original video sequence characteristics information generator unit 130 can use an edge region extraction algorithm for extracting the edge regions from the first-resolution original video sequence and can measure the degree of degradation at the edge regions by computing the mean squared error (MSE) of edge regions obtained with operations that employ thresholding.

As an example of an edge region detection algorithm, a gradient operator can be used.

The original video sequence characteristics information generator unit 130 can apply the edge region extraction algorithm using a vertical gradient operator to generate a vertical gradient image.

Here, the "vertical gradient image" can refer to generating a vertical gradient image by applying a vertical gradient operator with respect to the pixels of the first-resolution original video sequence.

Concurrently with (or subsequently to) generating the vertical gradient image, the original video sequence characteristics information generator unit 130 can generate a horizontal gradient image by applying a horizontal gradient operation to the first-resolution original video sequence.

Here, the "horizontal gradient image" can refer to generating a horizontal gradient image by applying a horizontal gradient operator with respect to the pixels of the first-resolution original video sequence.

Afterwards, the original video sequence characteristics information generator unit 130 can perform an absolute value operation on the each of the vertical gradient image and the horizontal gradient image above to generate a vertical and horizontal gradient image and can extract pixels of a predetermined level or above in the generated vertical and horizontal gradient image to find the edge regions for MSE computation.

The characteristics information pertaining to the first-resolution original video sequence can include the position information and pixel values of (one or more) such edge regions, and can be used instead of the first-resolution original video sequence at the receiving device 20 side where obtaining the first-resolution original video sequence may not be easy.

The video quality index calculator unit 140 can compare the first-resolution original video sequence with the first-resolution decoded video sequence to calculate a first video quality index.

Here, the "first video quality index" and its corresponding weight can be expressed as $\alpha \text{VQM}_1$, where $\alpha$ is a weight that can be expressed according to the properties of the video sequence as a function of the spatial frequency property of the first-resolution original video sequence, movements, the transmission resolution (i.e. the second resolution), etc.

Also, the video quality index calculator unit 140 can compare the second-resolution original video sequence with the second-resolution decoded video sequence to calculate a second video quality index.

Here, the "second video quality index" and the weight can be expressed as $\beta \text{VQM}_2$, where $\beta$ is a weight that can be expressed according to the properties of the video sequence as a function of the spatial frequency property of the second-resolution original video sequence, movements, the transmission resolution (i.e. the second resolution), etc., in a manner similar to the weight $\alpha$.

When calculating a quality index, the video quality index calculator unit 140 can calculate the edge peak signal-to-noise ratio (EPSNR) in the edge regions. The output results of the original video sequence characteristics information generator unit 130 can be used here, as described later on.

On the other hand, the video quality index calculator unit 140 can also calculate the first video quality index and second video quality index by using the information pertaining to the characteristics of the first-resolution original video sequence and the information pertaining to the characteristics of the second-resolution original video sequence generated at the original video sequence characteristics information generator unit 130.

In other words, it is possible to calculate the video quality indexes using the characteristics information of the original images at only the receiving device 20, and it is also possible to calculate the video quality indexes using the characteristics information of the original images at the transmitting device 10.

The quality evaluator unit 150 can combine the first video quality index and the second video quality index to calculate the final video quality index, and can select a perceptual quality value corresponding to the final video quality index and provide it to the terminal (not shown) of the video quality monitoring operator.

The final video quality index ($VQM_{final}$) can be expressed in a mathematical form as follows:

$$VQM_{final} = \alpha VQM_1 + \beta VQM_2.$$

Figure 3:
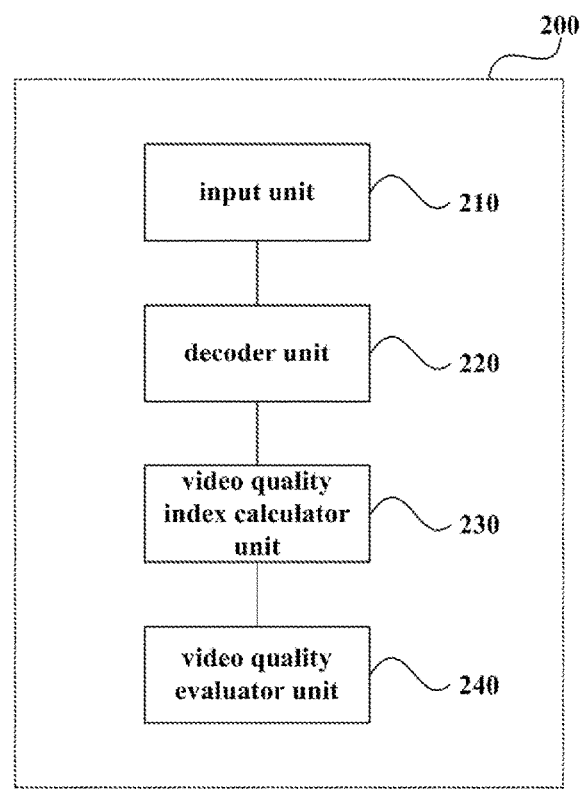
FIG. 3 illustrates the composition of an apparatus for evaluating video quality according to another embodiment of the invention.

FIG. 3 illustrates the composition of an apparatus for evaluating video quality according to another embodiment of the invention.

The video quality evaluation apparatus 200 according to another embodiment of the invention can be connected to a receiving device 20 and can include an input unit 210, a decoder unit 220, a video quality index calculator unit 230, and a video quality evaluator unit 240.

Looking at each of the components, the input unit 210 can receive an encoded second-resolution original video sequence as well as the characteristics information for the first-resolution original video sequence and the characteristics information for the second-resolution original video sequence.

On the other hand, the input unit 210 can receive the encoded second-resolution video sequence, the information pertaining to the characteristics of the first-resolution original video sequence, and the information pertaining to the characteristics of the second-resolution original video sequence from the receiving device 20 or from the quality evaluation apparatus 200 which receives the inputs from the transmitting device 10 directly.

Here, the encoded second-resolution video sequence, the information on the characteristics of the first-resolution original video sequence, and the information on the characteristics of the second-resolution original video sequence can be received from the transmitting device 10 via different packets or with a time difference to avoid errors that may occur when they are transmitted simultaneously.

The decoder unit 220 can decode the encoded second-resolution video sequence to generate a second-resolution decoded video sequence.

Also, the decoder unit 220 can interpolate the second-resolution decoded video sequence to the first resolution to generate the first-resolution decoded video sequence.

The video quality index calculator unit 230 can calculate a first' video quality index by using the information pertaining to the characteristics of the first-resolution original video sequence and the first-resolution decoded video sequence and can calculate a second' video quality index by using the information pertaining to the characteristics of the second-resolution original video sequence and the second-resolution decoded video sequence.

That is, since it may not be easy to obtain the first-resolution original video sequence and the second-resolution original video sequence at the receiving device 20 side, the characteristics information for each video sequence can be utilized instead of the original video sequence.

Of course, the information pertaining to the characteristics of the first-resolution original video sequence and the information pertaining to the characteristics of the second-resolution original video sequence can include characteristics other than the edge pixel information described above.

The quality evaluator unit 240 can combine the first' video quality index and the second' video quality index to calculate a final video quality index and can select a perceptual quality value corresponding to the final video quality index.

The final video quality index ($VQM_{final'}$) can be expressed in a mathematical form as follows:

$$VQM_{final'} = \alpha VQM_{1'} + \beta VQM_{2'}.$$

The final video quality index calculated at the video quality evaluator unit 240 and its corresponding perceptual quality index can be transmitted to the transmitting device 10, and the transmitting device 10 can use them to monitor the viewer's perceptual video quality.

Figure 4:
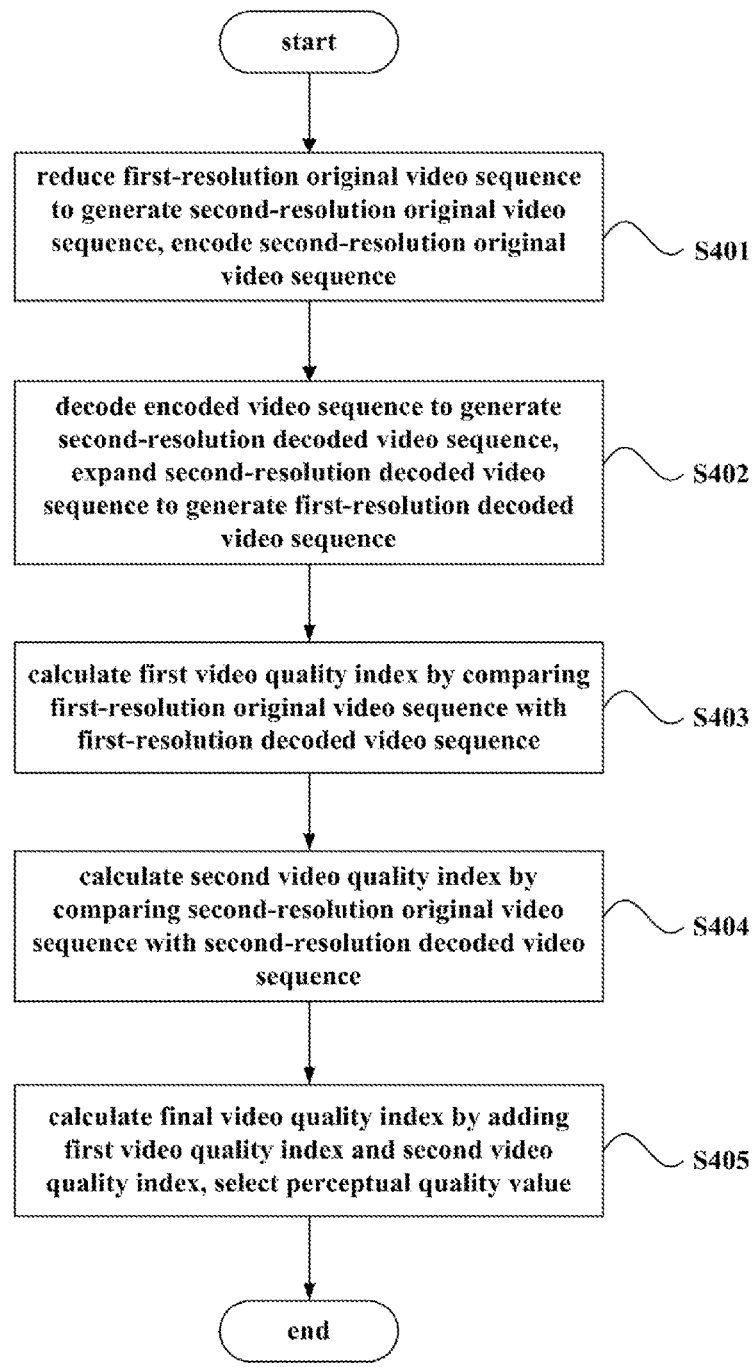
FIG. 4 is a flow diagram illustrating a procedure for evaluating video quality as performed by an apparatus for evaluating video quality according to an embodiment of the invention.

FIG. 4 is a flow diagram illustrating a procedure for evaluating video quality as performed by an apparatus for evaluating video quality according to an embodiment of the invention.

FIG. 4 shows an example in which the video quality evaluation apparatus 100 is connected with the transmitting device 10.

The video quality evaluation apparatus 100 may reduce a first-resolution original video sequence to a second resolution to generate a second-resolution original video sequence and may encode the second-resolution original video sequence (operation S401).

After operation S401, the video quality evaluation apparatus 100 may decode the encoded second-resolution video sequence to generate a second-resolution decoded video sequence and may interpolate the second-resolution decoded video sequence to the first resolution to generate a first-resolution decoded video sequence (operation S402).

After operation S402, the video quality evaluation apparatus 100 may compare the first-resolution original video sequence with the first-resolution decoded video sequence to calculate a first video quality index (operation S403).

Also, the video quality evaluation apparatus 100 may compare the second-resolution original video sequence with the second-resolution decoded video sequence to calculate a second video quality index (operation S404).

After operation S404, the video quality evaluation apparatus 100 may calculate a final video quality index by using the first video quality index and second video quality index, and may provide the calculated final video quality index and a perceptual quality value selected in correspondence to the final video quality index (operation S405).

Figure 5:
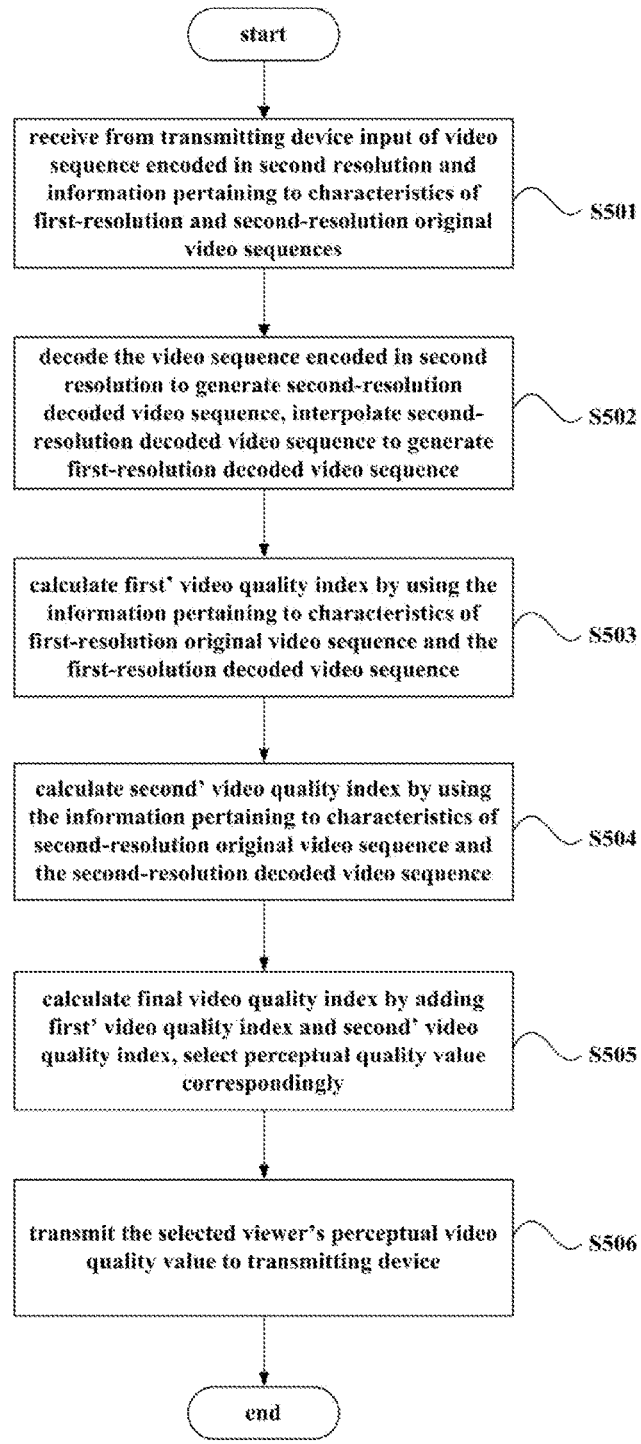
FIG. 5 is a flow diagram illustrating a procedure for evaluating video quality as performed by an apparatus for evaluating video quality according to another embodiment of the invention.

FIG. 5 is a flow diagram illustrating a procedure for evaluating video quality as performed by an apparatus for evaluating video quality according to another embodiment of the invention.

FIG. 5 shows an example in which the video quality evaluation apparatus 200 is connected with the receiving device 20.

The video quality evaluation apparatus 200 may receive an encoded video sequence obtained by encoding a second-resolution original video sequence, which is the first-resolution original video sequence converted to have a reduced second resolution, information pertaining to the characteristics of the first-resolution original video sequence, and information pertaining to the characteristics of the second-resolution original video sequence (operation S501).

Here, the encoded second-resolution video sequence, the information on the characteristics of the first-resolution original video sequence, and the information on the characteristics of the second-resolution original video sequence can be received from the transmitting device 10 via different packets or with a time difference.

After operation S501, the video quality evaluation apparatus 200 may decode the encoded second-resolution video sequence received in operation S501 and thus generate a second-resolution decoded video sequence, and may interpolate the second-resolution decoded video sequence to the first resolution to generate a first-resolution decoded video sequence (operation S502).

After operation S502, the video quality evaluation apparatus 200 may use the information on the characteristics of the first-resolution original video sequence and the first-resolution decoded video sequence to calculate a first' video quality index (operation S503).

Also, the video quality evaluation apparatus 200 may use the information on the characteristics of the second-resolution original video sequence and the second-resolution decoded video sequence to calculate a second' video quality index (operation S504).

After operation S504, the video quality evaluation apparatus 200 may combine the first' video quality index and the second' video quality index to calculate a final video quality index and may select a perceptual quality value corresponding to the calculated final video quality index (operation S505).

After operation S505, the video quality evaluation apparatus 200 may transmit the results of operation S505 to the transmitting device 10, enabling the transmitting device 10 to monitor the viewer's perceptual video quality (operation S506).

Figure 6:
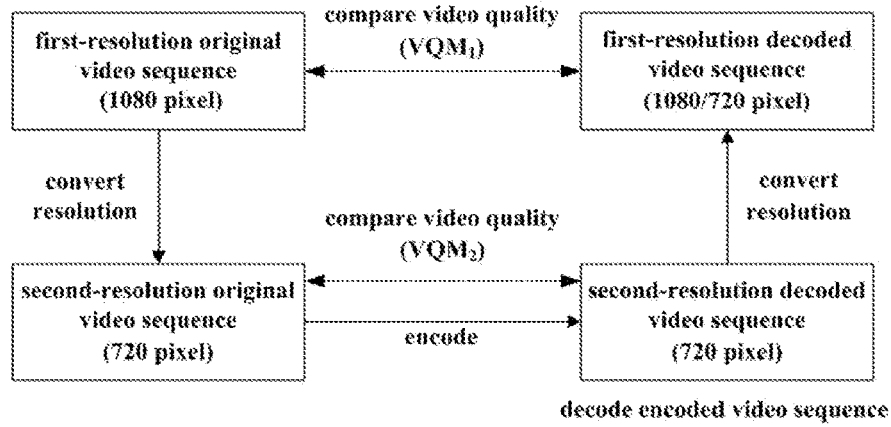
FIG. 6 is a flow diagram illustrating a procedure for evaluating video quality as performed by an apparatus for evaluating video quality according to yet another embodiment of the invention.
Figure 6:
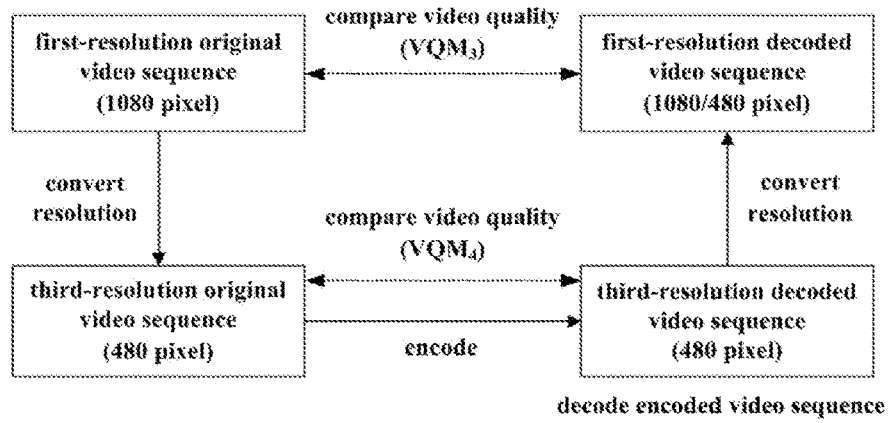
Figure 6:
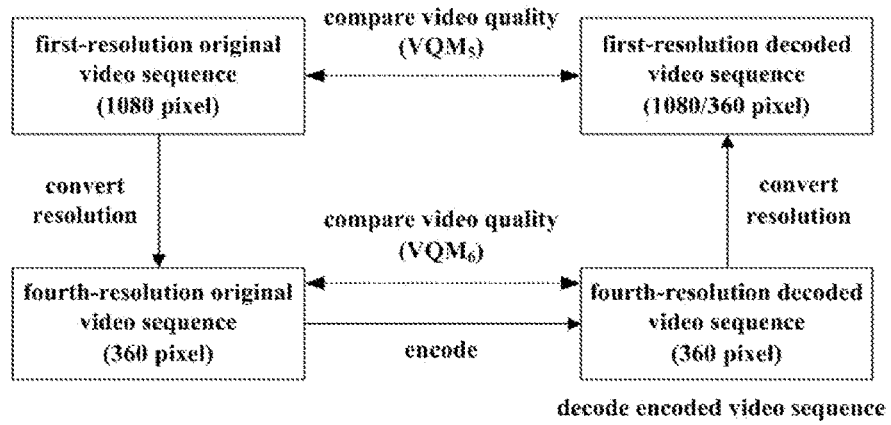

FIG. 6 is a flow diagram illustrating a procedure for evaluating video quality as performed by an apparatus for evaluating video quality according to yet another embodiment of the invention.

The method of evaluating video quality illustrated in FIG. 6 can be performed by a video quality evaluation apparatus 100 connected to a transmitting device 10.

In the example shown in FIG. 6, the video quality evaluation apparatus 100 can generate a multiple number of reduced-resolution video sequences by reducing an original video sequence having a first resolution. For this, a resolution reducer unit (not shown) can further be included, although it is not shown in FIG. 2 or FIG. 3.

As described above, the video quality evaluation apparatus 100 may calculate a first video quality index using the first-resolution original video sequence and the first-resolution decoded video sequence and may calculate a second video quality index using the second-resolution original video sequence and the second-resolution decoded video sequence, and may use these indexes to calculate the final video quality index.

In another embodiment for calculating the video quality index of a video, multiple resolutions can be applied to an original video sequence, and the video quality indexes of the multiple resolutions can all be combined together in calculating the final video quality index.

For example, as illustrated in FIG. 6, a first-resolution original video sequence may have a vertical resolution of 1080 pixels. To be encoded in the vertical resolution of 720 pixels, the first-resolution original video sequence may be reduced to a vertical resolution of 720 pixels to generate a second-resolution original video sequence (720 p).

After this second-resolution original video sequence is encoded, it may be decoded again to generate a second-resolution decoded video sequence (720 p), which may be interpolated to the first resolution to generate a first-resolution decoded video sequence (1080 p/720 p).

Afterwards, the first-resolution original video sequence (1080 p) and the first-resolution decoded video sequence (1080 p/720 p) can be compared to calculate a first video quality index ($VQM_1$), and the second-resolution original video sequence (720 p) and the second-resolution decoded video sequence (720 p) can be compared to calculate a second video quality index ($VQM_2$).

Moreover, the first-resolution original video sequence may be reduced to a third resolution of 480-pixel vertical resolution to generate a third-resolution original video sequence (480 p).

After this third-resolution original video sequence is encoded, it may be decoded again to generate a third-resolution decoded video sequence (480 p), which may be interpolated to the first resolution to generate a first-resolution decoded video sequence (1080 p/480 p).

Afterwards, the first-resolution original video sequence (1080 p) and the first-resolution decoded video sequence (1080 p/480 p) can be compared to calculate a third quality index ($VQM_3$), and the third-resolution original video sequence (480 p) and the third-resolution decoded video sequence (480 p) can be compared to calculate a fourth quality index ($VQM_4$).

Also, the first-resolution original video sequence may be reduced to a fourth resolution of 360-pixel vertical resolution to generate a fourth-resolution original video sequence (360 p).

After this fourth-resolution original video sequence is encoded, it may be decoded again to generate a fourth-resolution decoded video sequence (360 p), which may be interpolated to the first resolution to generate a first-resolution decoded video sequence (1080 p/360 p). Afterwards, the first-resolution original video sequence (1080 p) and the first-resolution decoded video sequence (1080 p/360 p) can be compared to calculate a fifth quality index ($VQM_5$), and the fourth-resolution original video sequence (360 p) and the fourth-resolution decoded video sequence (360 p) can be compared to calculate a sixth quality index ($VQM_6$).

In this case, the final video quality index can be expressed as follows:

$$VQM_{final} = \Sigma_i \alpha_i VQM_i.$$

In other words, $$VQM_{final} = \alpha_1 VQM_1 + \alpha_2 VQM_2 + \alpha_3 VQM_3 + \alpha_4 VQM_4 + \alpha_5 VQM_5 + \alpha_6 VQM_6.$$

Here, $\alpha_i$ is a weight and can be expressed as a function related to the reduced resolution. Some examples of possible equations include the following:

$$\alpha_i = f(\text{height, width})$$

$$\alpha_i = k_i \log(\text{height})$$

$$\alpha_i = k_i \log(\text{height}*\text{width})$$

$$\alpha_i = k_i \sqrt{\text{height}}$$

$$\alpha_i = k_i (H)^x, \text{ H:height}.$$

Here, the height and width may represent the number of pixels counted vertically and the number of pixels counted horizontally for the video sequence.

Also, as described above, the weights can represent the properties of the video sequences and can be calculated using a function of the spatial frequency properties of the original video sequences, the degrees of movement, transmission resolution, etc.

As another example of calculating the video quality indexes of the video sequences at a receiving device 20, the receiving device 20 can receive as input from the transmitting device 10 the characteristics information of the first-resolution original video sequence, the characteristics information of each of the reduced-resolution original video sequences (the second to fourth resolutions), and a specified-resolution encoded video, which is an encoded form of an original video sequence having the specified resolution.

Afterwards, the receiving device 20 can decode the specified-resolution encoded video to generate a specified-resolution decoded video sequence, and interpolate or reduce the specified-resolution decoded video sequence to generate a first-resolution decoded video sequence, which has the same resolution as the first-resolution original video sequence, and reduced-resolution decoded video sequences, which have the same resolutions as the reduced-resolution original video sequences, respectively.

For example, if the specified resolution is a second resolution, the receiving device can decode the second resolution encoded video to generate a second-resolution decoded video sequence (720 p), interpolate the second-resolution decoded video sequence to generate a first-resolution decoded video sequence (1080 p/720 p), and reduce the second-resolution decoded video sequence to generate a third-resolution decoded video sequence (480 p) or generate a fourth-resolution decoded video sequence (360 p).

Afterwards, the receiving device 20 can interpolate the third-resolution decoded video sequence (480 p) and fourth-resolution decoded video sequence (360 p) to the first resolution to generate a first-resolution decoded video sequence of 1080 p/480 p and a first-resolution decoded video sequence of 1080 p/360 p.

Afterwards, the receiving device 20 can calculate original resolution quality indexes by using the characteristics information for the first-resolution original video sequence and the first-resolution decoded video sequences (1080 p/720 p, 1080 p/480 p, 1080 p/360 p) and can calculate reduced-resolution quality indexes by using the characteristics information for the second to fourth reduced-resolution original images and the second-resolution to fourth-resolution decoded video sequences.

Afterwards, the receiving device 20 can calculate the final video quality index by using the original-resolution video quality index and the reduced-resolution video quality indexes, as in the method illustrated in FIG. 6.

The descriptions of the invention provided above are for illustrative purposes, and those having ordinary skill in the field of art to which the present invention pertains would understand that it is possible to conceive of specific variations without departing from the technical spirit or critical features of the present invention.

Therefore, it is to be appreciated that the embodiments described above are merely illustrative examples in all aspects and do not limit the present invention.

For example, an element described as an integrated form can be practiced in a distributed form, and likewise, an element described as a distributed form can be practiced in an integrated form.

The scope of the invention is defined by the scope of claims set forth below. All modifications and variations that can be derived from the meaning, scope, and equivalent concepts of the claims are interpreted as being encompassed within the scope of the present invention.

What is claimed is:

1. An apparatus for evaluating video quality, the apparatus comprising:
    an encoder—unit configured to convert a first-resolution original video sequence into a second-resolution original video sequence and encode the second-resolution original video sequence, the encoder unit configured to convert the first-resolution original video sequence into the second-resolution original video sequence by reducing the first-resolution original video sequence from the first resolution to the second resolution;
    a decoder unit configured to generate a second-resolution decoded video sequence and convert the second-resolution decoded video sequence into the first-resolution decoded video sequence, the decoder unit configured to generate the second-resolution decoded video sequence by decoding the encoded second-resolution video sequence, the decoder unit configured to convert the second-resolution decoded video sequence into the first-resolution decoded video sequence by interpolating the second-resolution decoded video sequence to the first resolution;
    a video quality index calculator unit configured to calculate a first video quality index based on a comparison between the first-resolution original video sequence and the first-resolution decoded video sequence and calculate a second video quality index based on a comparison between the second-resolution original video sequence and the second-resolution decoded video sequence; and
    a video quality evaluator unit configured to calculate a final video quality index by using the first video quality index and the second video quality index.

2. The apparatus for evaluating video quality according to claim 1, wherein the quality evaluator unit applies weights to the first video quality index and the second video quality index by considering video properties, which include at least one or more of a frequency of the first-resolution original video sequence, movement, and the second resolution, when calculating the final video quality index.

3. The apparatus for evaluating video quality according to claim 1, wherein the quality evaluator unit selects and provides a perceptual quality value corresponding to the final video quality index.

4. The apparatus for evaluating video quality according to claim 1, wherein the quality evaluator unit applies a value associated with quality degradation caused by transmission errors when calculating the final video quality index.

5. An apparatus for evaluating video quality, the apparatus comprising:
    an input unit configured to receive an encoded data of a second-resolution original video sequence obtained by reducing a first-resolution original video sequence to the second resolution, information pertaining to characteristics of the first-resolution original video sequence, and information pertaining to characteristics of the second-resolution original video sequence;
    a decoder unit configured to generate a second-resolution decoded video sequence by decoding the encoded data and convert the second-resolution decoded video sequence into a first-resolution decoded video sequence by interpolating the second-resolution decoded video sequence to the first resolution;

a video quality index calculator unit configured to calculate a first video quality index based on a comparison between the information pertaining to characteristics of the first-resolution original video sequence and the first-resolution decoded video sequence and calculate a second video quality index based on a comparison between the information pertaining to characteristics of the second-resolution original video sequence and the second-resolution decoded video sequence; and a video quality evaluator unit configured to calculate a final video quality index by using the first video quality index and the second video quality index, wherein the encoded data of the second-resolution original video sequence, the information pertaining to characteristics of the first-resolution original video sequence, and the information pertaining to characteristics of the second-resolution original video sequence are received from a transmitting device.

6. The apparatus for evaluating video quality according to claim 5, wherein the information pertaining to characteristics of the first-resolution original video sequence and the information pertaining to characteristics of the second-resolution original video sequence include pixel values and position information of an edge region present in the first-resolution original video sequence and the second-resolution original video sequence.

7. The apparatus for evaluating video quality according to claim 5, wherein the encoded data of the second-resolution original video sequence, the information pertaining to characteristics of the first-resolution original video sequence, and the information pertaining to characteristics of the second-resolution original video sequence are received using different packets or are received with a time difference, when received from the transmitting device.

8. The apparatus for evaluating video quality according to claim 5, wherein the quality evaluator unit applies weights to the first video quality index and the second video quality index by considering video properties, which include at least one or more of a frequency of the first-resolution original video sequence, movement, and the second resolution, when calculating the final video quality index.

9. The apparatus for evaluating video quality according to claim 5, wherein the quality evaluator unit applies a value associated with quality degradation caused by transmission errors when calculating the final video quality index.

10. A method of evaluating video quality, the method performed by an apparatus for evaluating video quality, the method comprising:

(a) converting a first-resolution original video sequence into a second-resolution original video sequence by reducing the first resolution and encoding the second-resolution original video sequence thereby producing an encoded second-resolution video sequence;

(b) generating a second-resolution decoded video sequence by decoding the encoded second-resolution video sequence and converting the second-resolution decoded video sequence into a first-resolution decoded video sequence by interpolating the second-resolution decoded video sequence to the first resolution;

(c) calculating a first video quality index based on a comparison between the first-resolution original video sequence and the first-resolution decoded video sequence and calculating a second video quality index based on a comparison between the second-resolution original video sequence and the second-resolution decoded video sequence; and (d) calculating a final video quality index by using the first video quality index and the second video quality index.

11. A method of evaluating video quality, the method performed by an apparatus for evaluating video quality, the method comprising:

(a) receiving an encoded data of a second-resolution original video sequence obtained by reducing a first-resolution original video sequence, information pertaining to characteristics of the first-resolution original video sequence, and information pertaining to characteristics of the second-resolution original video sequence;

(b) generating a second-resolution decoded video sequence by decoding the encoded data of a second-resolution original video sequence and converting the second-resolution decoded video sequence into a first-resolution decoded video sequence by interpolating the second-resolution decoded video sequence to the first resolution;

(c) calculating a first video quality index based on a comparison between the information pertaining to characteristics of the first-resolution original video sequence and the first-resolution decoded video sequence and calculating a second video quality index based on a comparison between the information pertaining to characteristics of the second-resolution original video sequence and the second-resolution decoded video sequence; and (d) calculating a final video quality index by using the first video quality index and the second video quality index, wherein the encoded data of a second-resolution original video sequence, the information pertaining to characteristics of the first-resolution original video sequence, and the information pertaining to characteristics of the second-resolution original video sequence are received from a transmitting device.

12. An apparatus for evaluating video quality, the apparatus comprising:

a resolution reduction unit configured to generate a plurality of reduced-resolution original video sequences by reducing a resolution of an original video sequence to a plurality of resolutions;

encoder unit configured to encode the original video sequence and the plurality of reduced-resolution original video sequences thereby producing a encoded original video sequence and a plurality of encoded reduced-resolution video sequences;

a decoder unit configured to generate an original-resolution decoded video sequence by decoding the encoded original video sequence and generate a plurality of reduced-resolution decoded video sequences by decoding the plurality of encoded reduced-resolution video sequences;

a video quality index calculator unit configured to calculate an original-resolution quality index based on a comparison between the original video sequence and the original-resolution decoded video sequence and calculate a plurality of reduced-resolution quality indexes based on comparisons between the plurality of reduced-resolution original video sequences and the plurality of reduced-resolution decoded video sequences, respectively; and a video quality evaluator unit configured to calculate a final video quality index by using the original-resolution quality index and the plurality of reduced-resolution quality indexes.

13. A method of evaluating video quality, the method performed by an apparatus for evaluating video quality, the method comprising:
   (a) generating a plurality of reduced-resolution original video sequences by reducing a resolution of an original video sequence to a plurality of resolutions;
   (b) encoding the original video sequence and the plurality of reduced-resolution original video sequences thereby producing an encoded original video sequence and a plurality of encoded reduced-resolution video sequences;
   (c) generating an original-resolution decoded video sequence by decoding the encoded original video sequence and generating a plurality of reduced-resolution decoded video sequences by decoding the plurality of encoded reduced-resolution video sequences;
   (d) calculating an original-resolution quality index based on a comparison between the original video sequence and the original-resolution decoded video sequence and calculating a plurality of reduced-resolution quality indexes based on comparisons between the plurality of reduced-resolution original video sequences and the plurality of reduced-resolution decoded video sequences, respectively; and
   (e) calculating a final video quality index by using the original-resolution quality index and the plurality of reduced-resolution quality indexes.

14. An apparatus for evaluating video quality, the apparatus comprising:
   an input unit configured to receive information pertaining to characteristics of a first-resolution original video sequence, information pertaining to characteristics of a plurality of reduced-resolution original video sequences obtained by reducing the first-resolution original video sequence from the first resolution to a plurality of resolutions, and a specified-resolution encoded video sequence encoded in the specified resolution, wherein the specified resolution is any one of the first resolution and the plurality of resolutions;
   a decoder unit configured to generate a specified-resolution decoded video sequence by decoding the specified-resolution encoded video and generate a first-resolution decoded video sequence and reduced-resolution decoded video sequences by interpolating or reducing the specified-resolution decoded video sequence, the first-resolution decoded video sequence having a same resolution as the first-resolution original video sequence, the reduced-resolution decoded video sequences having same resolutions as the reduced-resolution original video sequences;
   a video quality index calculator unit configured to calculate a plurality of quality indexes by using the information pertaining to characteristics of the first-resolution original video sequence, the information pertaining to characteristics of the plurality of reduced-resolution original video sequences, the first-resolution decoded video sequence, and the reduced-resolution decoded video sequences; and
   video quality evaluator unit configured to calculate a final video quality index by using the plurality of quality indexes,
   wherein the specified-resolution encoded video, the information pertaining to characteristics of the first-resolution original video sequence, and the information pertaining to characteristics of the plurality of reduced-resolution original video sequences are received from a transmitting device.

15. A method of evaluating video quality, the method performed by an apparatus for evaluating video quality, the method comprising:
   (a) receiving information pertaining to characteristics of a first-resolution original video sequence, information pertaining to characteristics of a plurality of reduced-resolution original video sequences obtained by reducing the first-resolution original video sequence to a plurality of resolutions, and a specified-resolution encoded video encoded in a specified resolution, wherein the specified resolution is any one of the first resolution and the plurality of resolutions;
   (b) generating a specified-resolution decoded video sequence by decoding the specified-resolution encoded video and generating a first-resolution decoded video sequence and reduced-resolution decoded video sequences by interpolating or reducing the specified-resolution decoded video sequence, wherein the first-resolution decoded video sequence has a same resolution as the first-resolution original video sequence, and the reduced-resolution decoded video sequences have same resolutions as the reduced-resolution original video sequences;
   (c) calculating a plurality of quality indexes by using the information pertaining to characteristics of the first-resolution original video sequence, the information pertaining to characteristics of the plurality of reduced-resolution original video sequences, the first-resolution decoded video sequence, and the reduced-resolution decoded video sequences; and
   (d) calculating a final video quality index by using the plurality of quality indexes,
   wherein the specified-resolution encoded video, the information pertaining to characteristics of the first-resolution original video sequence, and the information pertaining to characteristics of the plurality of reduced-resolution original video sequences are received from a transmitting device.

16. The apparatus for evaluating video quality according to claim 12,
   wherein, the final video quality index is calculated based on the following equation $$VQM_{final} = \sum_i \alpha_i VQM_i$$

where $VQM_i$ represents the video quality index of the $i^{th}$ resolution video sequence, $\alpha_i$ is a weight, and $\alpha_i$ is determined using one of the following equations:

$\alpha_i = f(\text{height, width})$ $\alpha_i = k_i \log(\text{height})$ $\alpha_i = k_i \log(\text{height*width})$ $\alpha_i = k_i \sqrt{\text{height}}$ $\alpha_i = k_i (H)^x$, H:height where f( ) represents a function, $k_i$ represents a degree of movement, height and width represent the number of vertical pixels and the number of horizontal pixels, respectively.

17. The apparatus for evaluating video quality according to claim 14,
wherein, the final video quality index is calculated based on the following equation $$VQM_{final} = \sum_i \alpha_i VQM_i$$

where $VQM_i$ represents the video quality index of the $i^{th}$ resolution video sequence, $\alpha_i$ is a weight, and $\alpha_i$ is determined using one of the following equations:

$\alpha_i = f(\text{height, width})$ $\alpha_i = k_i \log(\text{height})$ $\alpha_i = k_i \log(\text{height} * \text{width})$ $\alpha_i = k_i \sqrt{\text{height}}$ $\alpha_i = k_i (H)^x$, H:height where f( ) represents a function, $k_i$ represents a degree of movement, height and width represent the number of vertical pixels and the number of horizontal pixels, respectively.

* * * * *